United States Patent [19]

Rokas

[11] 4,268,899
[45] May 19, 1981

[54] BRIDGE-DOUBLER RECTIFIER

[75] Inventor: Gary J. Rokas, Lasalle, Canada

[73] Assignee: Sperry Corporation, New York, N.Y.

[21] Appl. No.: 48,855

[22] Filed: Jun. 15, 1979

[51] Int. Cl.³ .............................................. H02M 7/02
[52] U.S. Cl. .................................................... 363/61
[58] Field of Search .................................. 363/59–61, 363/125, 126

[56] References Cited

U.S. PATENT DOCUMENTS

| | | | |
|---|---|---|---|
| 3,354,379 | 11/1967 | Swain et al. | 363/61 |
| 3,851,182 | 11/1974 | Wallace | 363/60 X |
| 3,961,152 | 6/1976 | Staats | 363/126 X |
| 4,193,111 | 3/1980 | Wester | 363/126 X |

OTHER PUBLICATIONS

General Electric SCR Manual, 4th Edition, 1967, pp. V, 137, 138, 143, 144.

*Primary Examiner*—William M. Shoop
*Attorney, Agent, or Firm*—Douglas L. Tschida; Kenneth T. Grace; William E. Cleaver

[57] ABSTRACT

A full wave (RMS) bridge circuit is disclosed for regulating a nominal 200 to 240 V AC bulk voltage to a nominal 300 V full wave rectified DC bulk voltage for all line and load conditions. The circuit automatically adjusts to varying line voltages and operates in any one of four modes: (i) full wave bridge, (ii) phase controlled bridge-doubler, (iii) phase controlled doubler, or (iv) non-controlled doubler to maintain the nominal DC output voltage.

6 Claims, 11 Drawing Figures

BRIDGE-DOUBLER RECTIFIER

BACKGROUND OF THE INVENTION

The present invention relates to switched mode power supplies and more particularly to the input rectifier and providing for phase controlled voltage regulation of the AC line voltage to maintain a nominal DC voltage to the inverter section of the power supply.

In recent years, switched mode power supplies have captured a significant share of the market for computer-based power supplies. Of these units, the off-line inverter is the most attractive requiring no 60 Hz magnetic components for its operation. One section of this type of power supply is the input rectifier which is used to produce a DC bulk voltage from the AC input line. This raw DC bulk voltage is then switched at high frequency by the inverter section and pulse width modulated to produce a stable output voltage independent of line and load variations.

Present designs, in response to computer system demands for "brown-out" capabilities to 66% of nominal line conditions, permit the bulk DC voltage to vary from approximately 170 to 360 V DC, when operating from a nominal voltage of 200 to 240 V AC. The upper limit of 360 V is compatible with the present state of transistor technology incorporating 400 V high speed devices. The lower limit, however, presents somewhat of a problem in that the turns ratio of the inverter's high frequency transformer is set by the ratio of low line DC input voltage to the required DC output voltage, assuming the inverter is operating at maximum pulse width. Increasing the input voltage results in decreasing the pulse width. Large voltage variations, therefore, result in the inverter operating at a fraction of its power switch section capability. There is a need for a circuit which will regulate this bulk voltage to a nominal value from 300 to 360 V DC for all line-load conditions. It is also desirable that this circuit be efficient and not require a line frequency transformer for its operation.

The present invention provides a solution to the above concerns and enables regulation of the bulk DC voltage available to the inverter to within 1% of the design limit when operating in the phase controlled modes of operation. The circuit has the further advantage of having its greatest power factor at high line conditions unlike conventional phase-controlled circuits which penalize the user for his "brown-out" capabilities by presenting a low power factor under normal line conditions.

SUMMARY OF THE INVENTION

Single phase and three phase embodiments of a rectifier circuit operable as a full wave bridge or as a phase controlled voltage doubler depending on the line-load conditions is disclosed. The circuit is comprised of a full wave, diode bridge coupled to a capacitor filter, wherein the capacitor filter is further coupled to the bridge via a controllable, bidirectional current means (i.e., triac, SCR pair or similar four layer devices) for tapping the filter and enabling the circuit to operate in a voltage doubler mode on alternate half cycles of the line voltage. A phase control circuit is also disclosed for controlling the operation of the bidirectional current means to maintain the DC load voltage at a nominal 300 volt level over a range of varying line conditions.

The rectifier circuit is operable in four modes, depending on the line-load conditions, which are as follows: (i) full wave bridge, (ii) phase controlled bridge-doubler, (iii) phase controlled doubler or (iv) uncontrolled doubler. As the line voltage decreases with respect to the load voltage on the capacitor filter, the rectifier circuit switches from the bridge mode to the phase controlled bridge-doubler mode, to the phase controlled doubler mode to the uncontrolled doubler mode depending on the relative difference. Where the line voltage exceeds the load voltage, however, the rectifier circuit is operable in the full wave bridge mode or the bridge-doubler mode if the load hasn't attained the nominal design value.

DESCRIPTION OF THE PREFERRED EMBODIMENT

Figure 1:
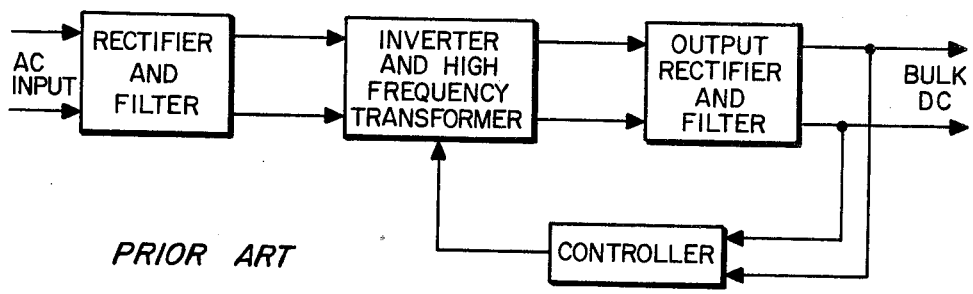
FIG. 1 is a block diagram of prior art switched mode power supplies.

Present switched mode power supplies are similar to the design shown in FIG. 1. The AC input is full wave rectified and capacitor filtered and the resultant bulk DC voltage is then switched at high frequency and pulse width modulated to provide a stable output voltage independent of line and load variations. Such systems, however, do not optimize the transfer of power to the switching transistors of the inverter. While standard phase control circuits are available to preregulate the bulk DC voltage to a value from 300 to 360 V DC, they have the consequential drawback of requiring a step-up transformer to achieve the nominal 360 volts compatible with present 400 V switching transistor inverter designs. Standard phase control circuits have the further drawback in that they have their lowest power factor during high line conditions and thus penalize the user during normal operation for his low line (i.e., brown-out) capabilities.

Figure 2:
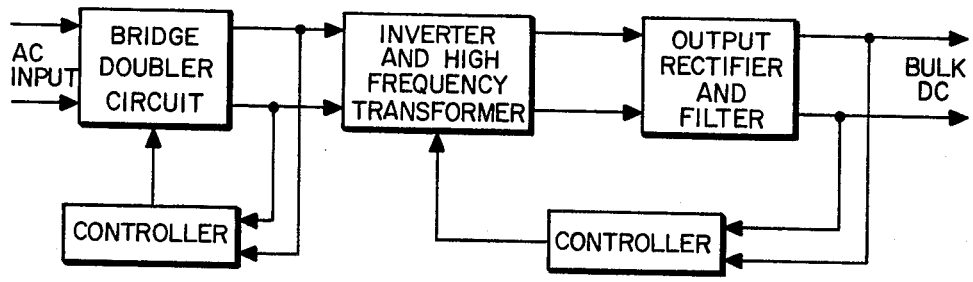
FIG. 2 is a block diagram of a switched mode power supply containing the bridge-doubler circuit of the present specification.

Referring to FIG. 2, a switched mode power supply having a pre-regulated DC bulk voltage via the bridge-doubler circuit of the present invention is shown which circuit alleviates the need for a step-up transformer and provides a high power factor during the high line, which is the normal operating condition. A bridge-doubler circuit for a single phase, AC input, typically 200/240 V (RMS), is shown in FIG. 3 and a controller for such a doubler-circuit is shown in FIG. 4.

The operation of the doubler circuit of FIG. 3 will now be described in its respective four modes of operation as the single phase AC input varies between its maximum and minimum design values. It is to be recognized, however, that the operation of the doubler circuit for a single phase input is analogous to that for a three phase input, which case will be more fully described hereinafter.

Figure 3:
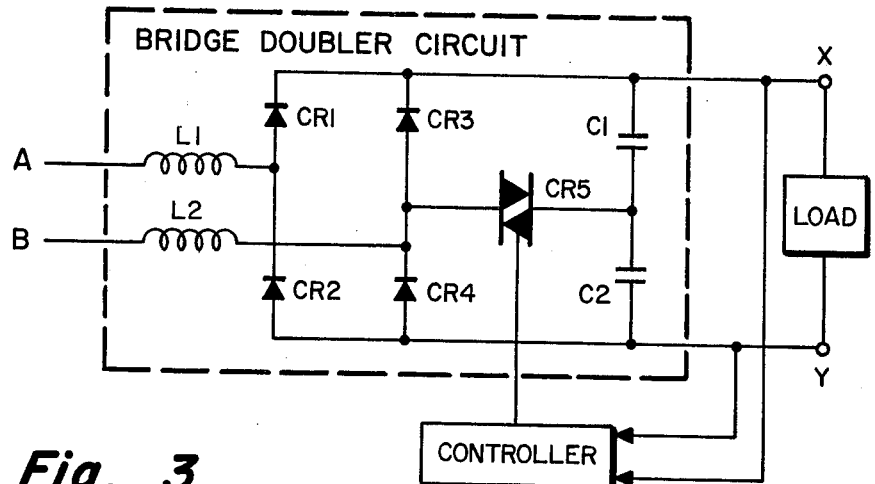
FIG. 3 is a circuit schematic of a bridge-doubler circuit for a single phase AC input.
Figure 4:
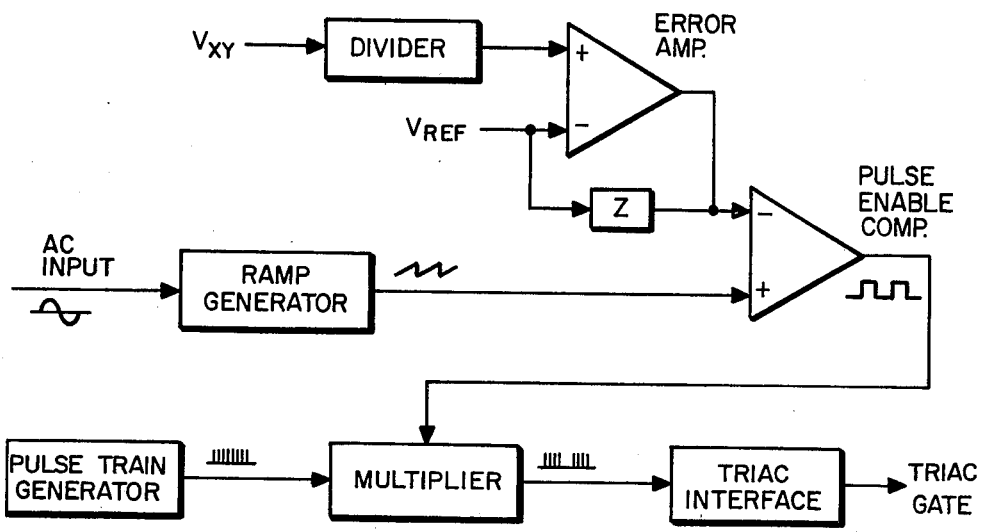
FIG. 4 is a block diagram of the controller circuit for the single phase bridge-doubler circuit of FIG. 3.

Referring to FIG. 3, when a single phase AC voltage $V_{AB}$ is impressed across the inputs A and B, the inductors L1 and L2 limit the rise time of the input current which reduces the RMS value of the current and improves the power factor of the circuit under all conditions.

Looking to the positive half cycle of $V_{AB}$, assuming that $V_{AB}$=240 V (RMS), that $V_{AB}$ (peak)>$V_{XY}$ and knowing that the normal peak value of $V_{AB}$ is 339.4 volts, diodes CR1 and CR4 are forward biased and capacitors C1 and C2 charge during the first quarter cycle and discharge through the load during the second quarter cycle when the diodes are reverse biased. In a similar manner during the negative half cycle, diodes CR2 and CR3 are forward biased, capacitors C1 and C2 charge and then discharge through the load. The voltage waveshape $V_{XY}$ across modes X and Y thus appears as a full wave rectified voltage, see FIG. 6a, however, by selecting appropriate size capacitors for C1 and C2, the time constant for the load and capacitor combination can be adjusted to be much greater than the frequency of the AC source to minimize the ripple of $V_{XY}$ and produce a relatively constant 300 V DC output. Thus, during a normal high line AC input condition, the circuit operates as an unregulated, capacitor filtered full wave bridge which operation is more specifically described in an article entitled, "Time Domain Analysis of the Power Factor for a Rectifier Filter System with Over/and Subcritical Inductance" by Francise C. Schwartz, IEEE Transactions on Industrial Electronics and Control Instrumentation, Vol. IECI 20, No. 2, May, 1973, pp. 61–68.

If the peak AC input voltage decreases due to "brown-out" conditions, the output $V_{XY}$ decreases below the desired DC level, and depending on whether $V_{AB}$ (peak)>$V_{XY}$ or $V_{AB}$ (peak)<$V_{XY}$, the circuit operates either in a phase controlled bridge-doubler mode or in a phase controlled doubler mode, and if $V_{AB}$ (peak)<$\frac{1}{2}V_{XY}$ (desired), the circuit operates in an uncontrolled doubler mode. In any event, the circuit discontinues operating in the full bridge mode and triac CR5 is pulsed by the controller.

During any of the three doubler modes of operation, CR5 is controllably pulsed "on" to act as a short circuit, and thus during a positive half cycle, CR1 is forward biased and charge flows from A through CR1 to charge C1 and then through CR5 to B. In a similar manner during the negative half cycle, charge flows from B through CR5 to charge C2 and then through C2 to A. The DC output voltage $V_{XY}$ is now the sum of the voltages to which C1 and C2 charge and will be dependent on the timing of when CR5 is pulsed in relation to $V_{in}$. The ripple component on $V_{XY}$ will also be greater than for the full bridge mode.

The controller of FIG. 3 which determines the point in time at which CR5 is pulsed during the various doubler modes is shown in FIG. 4 and operates to generate control pulses synchronized to the line frequency of $V_{AB}$ and to alter the phasing (i.e., exact timing) of these pulses and thus regulate $V_{XY}$ by controlling the charge time and resultant voltages to which C1 and C2 charge.

Figure 5:
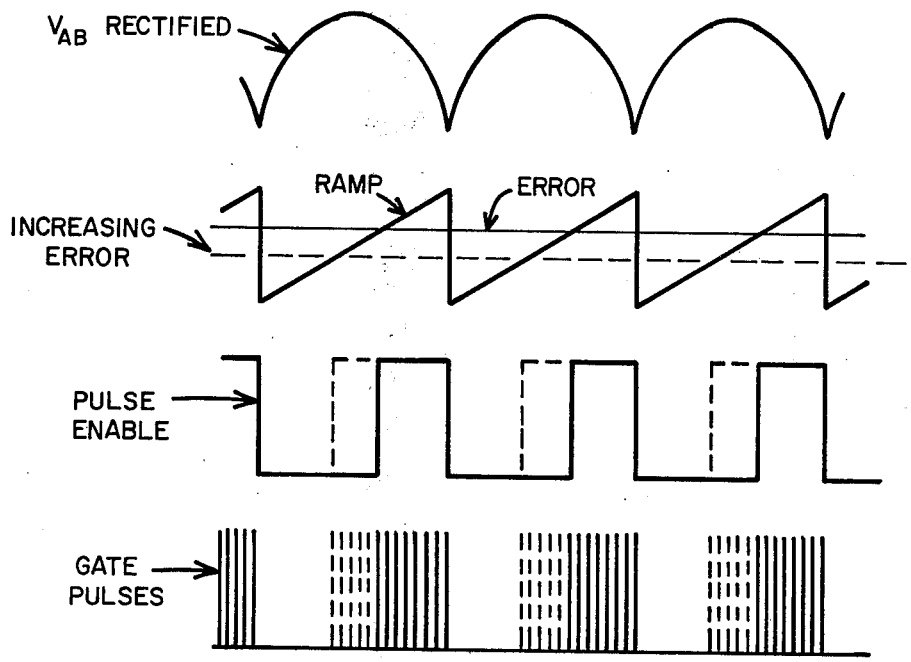
FIGS. 5a, b, c, d are representations of the various waveshapes that occur in the single phase controller of FIG. 4.

Referring to FIGS. 4 and 5, the controller and its operation will now be described. The ramp generator, coupled to the AC input $V_{AB}$ acts to produce a constant ramp voltage synchronized to $V_{AB}$ but having a fixed slope and peak voltage independent of $V_{AB}$. The output voltage $V_{XY}$ of the bridge-doubler circuit is next reduced by a suitable voltage divider to a level compatible with the operational error amplifier. The error amplifier then compares the reduced output signal to a constant DC reference voltage $V_{REF}$, which voltage is fixed at a value proportionate to the desired $V_{XY}$, to determine the difference between $V_{REF}$ and the actual output voltage. The error amplifier is further feedback coupled by an appropriate resistance, capacitance combination Z to stabilize the closed loop response of the system against high frequency ripple or noise which, upon amplification, could cause the system to oscillate.

The amplified difference or error signal from the error amplifier is next compared to the ramp generator output by the pulse enable comparator which generates a width modulated logic pulse, see FIG. 5c, used to enable the multiplier which is coupled to the pulse train generator, if the ramp signal is less than the error signal (i.e., high line AC input) a logic low is generated and the multiplier is disabled.

Referring to FIGS. 5b and 5d, if the ramp signal is greater than the error signal (i.e., low line AC input), a logic high is generated as long as the condition exists, the multiplier is enabled and a width modulated series of control pulses of a sufficient amplitude to turn CR5 "on" are produced. The width modulated gate control pulses are then impressed on a suitable triac interface (i.e., optical or transformer) to isolate the controller from the bridge-doubler circuit and trigger the triac "on" with each successive pulse.

From FIG. 5b it can also be seen that as the error signal decreases due to a decreasing $V_{XY}$, the ramp signal will intersect the error signal at an earlier time, which will cause CR5 to be pulsed "on" for a longer period of time permitting C1 and C2 to charge to higher voltage levels, and thus cause the output voltage $V_{XY}$ to rise and offset the voltage drop of $V_{in}$. The increase in $V_{XY}$ results because C1 and C2 are alternately permitted to charge to values in excess of that to which they would individually charge during the full bridge mode. The specific peak voltage to which C1 and C2 will charge during the controlled doubler modes is dependent on $V_{REF}$, since the controller enables the trigger pulses so long as an error signal is produced.

Figure 6:
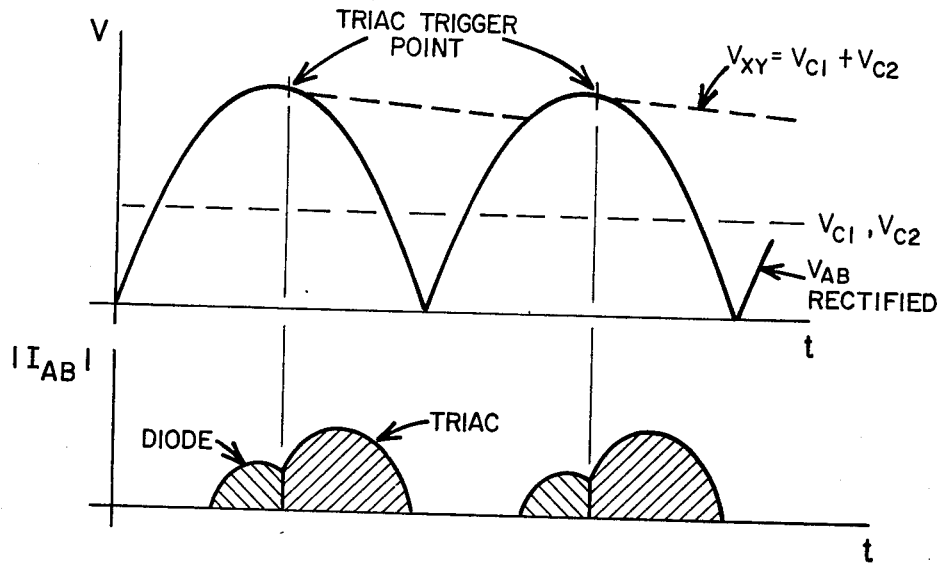
FIGS. 6a and b are representations of the waveshapes for the phase controlled bridge-doubler mode of operation for FIG. 3 assuming no load conditions.

Referring to FIGS. 3 and 6 and assuming the circuit is operating in the phase controlled bridge-doubler mode, where $V_{AB}$ (peak)>$V_{XY}$ but $V_{AB}$ (peak)<$V_{XY}$ (desired), the charge on C1 and C2 for each half cycle will be made up of two components of charge due to the operation of the circuit first in the bridge mode up to the point in time at which CR5 is triggered and then in the doubler mode for the period of time during which CR5 is pulsed. During the bridge mode, C1 and C2 will charge at the same time to approximately the same value if C1=C2, whereas during the doubler portion of the operation, C1 and C2 are free to charge to $V_{AB}$ but are limited by the ramp signal. From FIG. 6b the respective charge components for C1 and C2 can be seen in relation to the input current $I_{AB}$. The charge time of capacitors C1 and C2 determined by the trigger point will thus control the increase in VC1 and VC2 until VC1+VC2=$V_{XY}$ (desired).

If the circuit is operating in the phase controlled doubler mode, where $V_{AB}<V_{XY}$, the charge on C1 and C2 results only from the doubler component. It should again be recognized that if, however, $V_{AB}$ decreases to the point where $V_{AB}$ (peak)$<\frac{1}{2}V_{XY}$ (desired), CR5 is pulsed "on" continuously and the circuit will be uncontrolled until $V_{in}$ increases to the point where $V_{AB} \geq \frac{1}{2}V_{XY}$ (desired) and the circuit again operates in the phase controlled doubler mode until $V_{in}$ (peak)$>V_{XY}$ when it operates in the phase controlled bridge-doubler mode. This assumes no load conditions, whereas under load conditions the crossover point occurs for a larger $V_{AB}$.

Figure 7A:
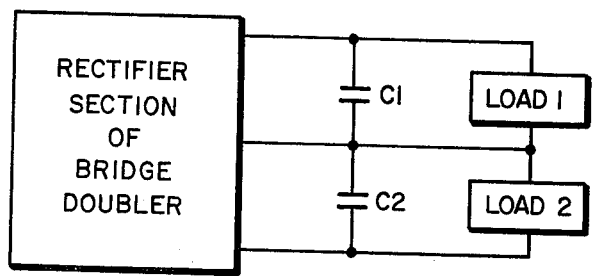
FIGS. 7a and b are block diagrams of various loading schemes possible for the bridge-doubler circuit.
Figure 7B:
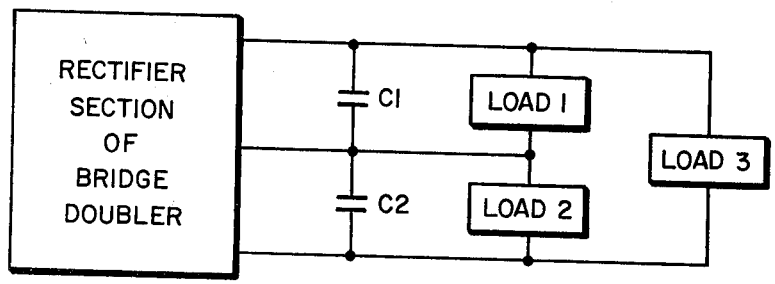

It should also be noted that the bridge-doubler circuit of the present invention is capable of operating in the centertapped, unbalanced load conditions of FIGS. 7a and 7b. Typically, however, the circuit will be used with a single load across X and Y where the load sees C1 and C2 as one source of current. With the loading arrangements shown and assuming loads 1 and 2 are equal in size, the current requirements of loads 1 and 2 don't affect the operation of the preferred embodiment in which C1=C2 and $V_{C1}=V_{C2}$. If, however, load 1≠load 2, the control circuit would have to be modified to provide the proper $V_{C1}$ and $V_{C2}$ by adjusting the ramp peak, $V_{REF}$ and control for each half cycle. In this manner, the individual charge times for C1 and C2 would be individually tailored to the constraints of the load condition.

Figure 8:
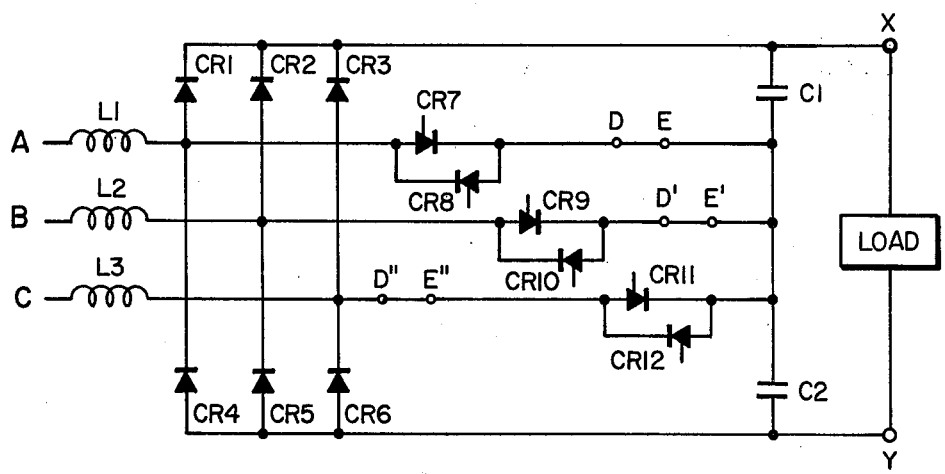
FIG. 8 is a circuit schematic of a bridge-doubler circuit for a three phase AC input.

While the operation of the bridge-doubler circuit has been described for the single phase AC input, the circuit is equally applicable to a three phase AC input. Given a three phase input, the circuit would be configured as in FIG. 8 and instead of using a triac as the control element to switch to the doubler modes of operation, parallel silicon controlled rectifiers (SCR's) are used. Triacs could be used but given certain phase angles between phases and pulse width conditions, it is possible that the triac could conduct current in the wrong direction in some circumstances. SCR's are therefore used since they are unidirectional devices and once pulsed "on" the direction of the current flow is fixed.

The operation of the three phase bridge-doubler is essentially the same as previously described for the single phase bridge-doubler, but now there are three single phase circuits operating 120° out of phase with each other and thus the capacitors C1 and C2 are being pulsed three times as much as before. A possible conduction sequence for the bridge mode and doubler modes of operation for the alternating inputs $V_{AB}$, $V_{AC}$ and $V_{BC}$ would be as follows:

| Input | Bridge Mode Diodes Conducting | Doubler Mode | | |
|---|---|---|---|---|
| | | Diode | SCR | Capacitor |
| AB (positive cycle) | CR1, CR5 | CR1 | CR10 | C1 |
| AC (positive cycle) | CR1, CR6 | CR6 | CR7 | C2 |
| BC (positive cycle) | CR2, CR6 | CR2 | CR12 | C1 |
| AB (negative cycle) | CR2, CR4 | CR4 | CR9 | C2 |
| AC (negative cycle) | CR3, CR4 | CR3 | CR8 | C1 |
| BC (negative cycle) | CR3, CR5 | CR5 | CR11 | C2 |

Figure 9:
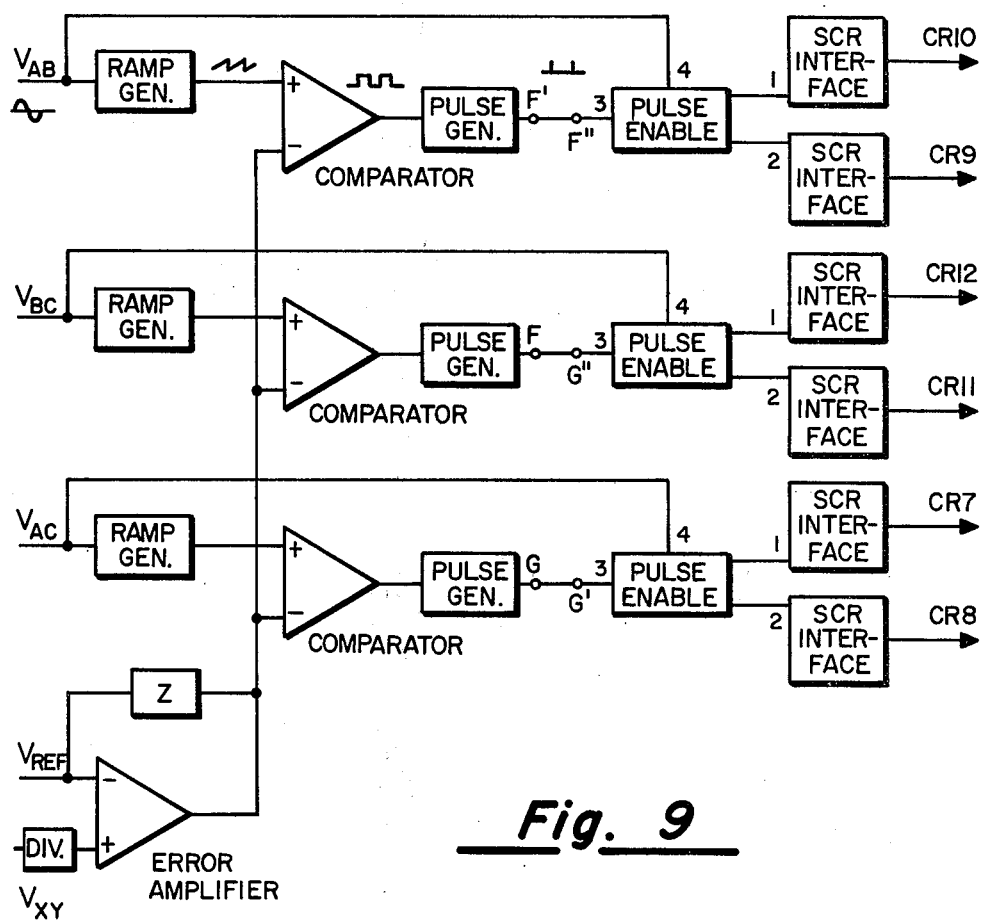
FIG. 9 is a block diagram of the controller circuit for the three phase bridge-doubler of FIG. 8.

The controller for the three phase bridge-doubler circuit is shown in FIG. 9 and again operates essentially the same as for three single phase controllers with each controller synchronized to its respective single phase input. The controller differs in that a pulse enable gate replaces the multiplier and is used to transmit the control pulse at node 3 to node 1 if the input on node 4 is positive and to node 2 if the input on node 4 is negative, thus alternately turning "on" one or the other of the SCR's depending on the phase of the input.

The technique for pulsing the SCR's is also changed slightly with the pulse enable comparator signal, still representing the time relationship for which the error signal is less than the peak ramp signal, now causing the pulse generator to produce a single pulse output as the leading edge of each pulse enable comparator signal goes "hi". In this manner, each SCR remains "on" so long as it is forward biased and has enough holding current. The "on" condition, therefore, sustains itself for the same period as described for the triac and the width modulated series of pulses.

While the three phase circuit operates essentially the same as for the single phase circuit with the above differences, it is to be further noted that it is desirable to ensure that no two SCR's are "on" at the same time to avoid the shorting of the input phases. To prevent the shorting of the inputs, a sense circuit is necessary to sense the current through each SCR (i.e., current transformer, Hall Effect device or opto-isolator) and inhibit the control pulses to each of the SCR's, such that only one SCR can conduct at any one time. Such an inhibit operation can be accomplished with the circuit shown in FIG. 10.

Figure 10:
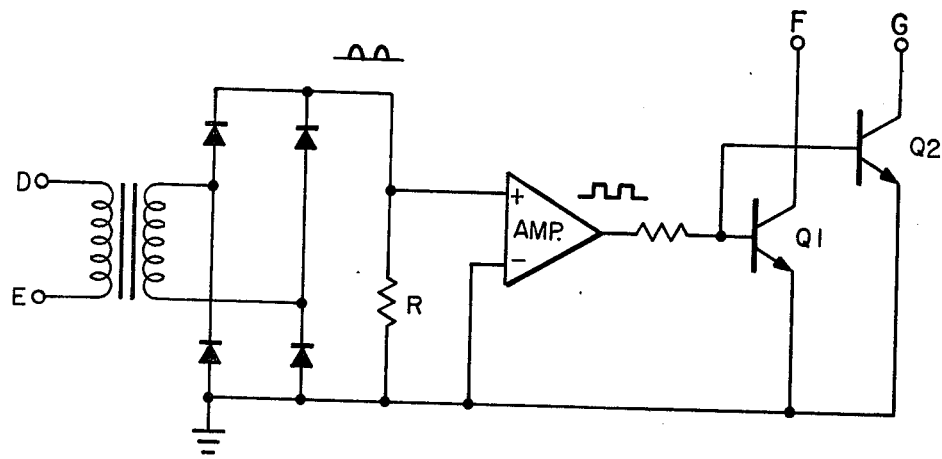
FIG. 10 is a circuit schematic for one of three sense circuits for ensuring that no two SCR's between phases are conducting at the same time in the bridge-doubler circuit of FIG. 8.

Referring to FIG. 10 one of three circuits for sensing and inhibiting the three input currents is shown. Each circuit has its D and E inputs coupled in series with each SCR combination between the bridge and the capacitor filter. Each circuit thus senses the SCR current flow in its current transformer, which causes a proportional voltage to be developed across resistor R. This voltage is then amplified by the high gain amplifier and used to drive transistors Q1 and Q2. The F and G inputs to the collectors of Q1 and Q2 are further coupled between the pulse generators and pulse enable gates and by turning Q1 and Q2 "on" the pulses from the pulse generators are grounded, thereby preventing the existence of a cross conduction condition. It is to be further noted that such circuits are to be coupled in the manner shown in FIGS. 8 and 9 for the corresponding inputs DEFG, D'E'F'G' and D"E"F"G".

While the present invention has been described with specific reference to its preferred embodiments, it is to be recognized that other embodiments may be devised by those skilled in the art without departing from the spirit and scope of this invention as encompassed by the following claims.

What is claimed is:

1. A rectifier circuit comprising:
   bridge means for rectifying at least one phase of an alternating input signal to a full wave signal;
   capacitor means coupled to said full wave signal and having a voltage control terminal for producing an output signal, the voltage level of said output signal remaining substantially constant as the peak level of said input signal varies;
   bidirectional current means having a gate and a first and second terminals, said first terminal connected to said voltage control terminal and said second terminal connected to said bridge means, for conducting current in response to a control signal; and
   control means coupled to said gate and producing said control signal for controlling the conduction time of said bidirectional current means, and thereby causing said rectifier to operate in a voltage doubler mode and regulate the level of said output signal, comprising;
- a constant reference voltage source proportional to the constant level desired of said output signal;
- ramp means coupled to said input signal for producing a ramp signal synchronized to said input signal;
- error means coupled to said output signal for comparing said reference voltage to a feedback signal, said feedback signal being proportional to said output signal, and producing an error signal;
- comparator means for comparing said error signal with said ramp signal and producing a pulse enable signal whenever said ramp signal is greater than said error signal;
- modulating means coupled to said pulse enable signal for phase width modulating said control signal, the conduction time of said bidirectional current means corresponding to the time width of said pulse enable signal.

2. A rectifier as set forth in claim 1 wherein said bidirectional current means comprises a triac.

3. A rectifier as set forth in claim 1 wherein said bidirectional current means comprises first and second silicon controlled rectifiers (SCR), each SCR having an anode, cathode and gate terminal, said anode of said first SCR coupled to said cathode of said second SCR said cathode of said first SCR coupled to said anode of said second SCR and said gate terminals coupled to said control signal, whereby only said first or second SCR can conduct during any given time.

4. A rectifier circuit comprising:
- bridge means for rectifying a three phase alternating input signal to first, second and third full wave signals;
- capacitor means coupled to said full wave signals and having a voltage control terminal for producing an output signal, the voltage level of said output signal remaining substantially constant as the peak level of said input signal varies;
- first, second and third bidirectional current means respectively coupled to said first, second and third full wave signals and to said voltage control terminal and each having a gate terminal for conducting current in response to a control signal;
- control means coupled to said gate terminals of said first, second and third switch means and producing first, second and third control signals for controlling the conduction time of said respective first, second and third switch means and thereby causing said rectifier to operate in a voltage doubler mode and regulate the level of said output signal comprising;
  - a constant reference voltage source proportional to the constant level desired of said output signal;
  - first, second and third ramp means each coupled to a respective one phase of said input signal for producing first, second and third ramp signals, each ramp signal synchronized to one phase of said input signal;
  - error means coupled to said output signal for comparing said reference voltage to a feedback signal, said feedback signal proportional to said output signal, and producing an error signal;
  - first, second and third comparator means, each for comparing said error signal to one of said respective first, second and third ramp signals and producing first, second and third pulse enable signals whenever said respective ramp signals are greater than said error signal;
  - first, second and third modulating means coupled to said respective first, second and third pulse enable signals for phase width modulating said respective first, second and third control signals, the conduction time of said first, second and third bidirectional current means corresponding to the width of said respective first, second and third pulse enable signals.

5. A rectifier as set forth in claim 4 including means coupled to said first, second and third bidirectional current means for ensuring that only one of said first, second and third bidirectional current means conducts at any given time thereby preventing shorting between said three phases.

6. A rectifier circuit comprising:
- bridge means for rectifying at least one phase of an alternating input signal to a full wave signal;
- capacitor means coupled to said full wave signal and having a voltage control terminal for producing an output signal, the voltage level of said output signal regulated to remain substantially constant as the peak level of said input signal varies;
- bidirectional current means coupled to said bridge means and said voltage terminal and having a gate terminal for conducting current in response to a control signal; and
- control means coupled to said gate terminal, said input signal and said output signal for producing said control signal whenever said output signal falls below the desired constant voltage level, thereby causing said rectifier to operate in a voltage doubler mode and regulate the level of said output signal.

* * * * *